United States Patent
Gölling

(10) Patent No.: US 9,573,678 B2
(45) Date of Patent: Feb. 21, 2017

(54) AIRCRAFT WITH A CONTROL DEVICE

(75) Inventor: Burkhard Gölling, Buchholz i.d.N (DE)

(73) Assignee: Airbus Operations GmbH, Hamburg (DE)

( * ) Notice: Subject to any disclaimer, the term of this patent is extended or adjusted under 35 U.S.C. 154(b) by 831 days.

(21) Appl. No.: 13/566,721

(22) Filed: Aug. 3, 2012

(65) Prior Publication Data

US 2013/0037658 A1 Feb. 14, 2013

Related U.S. Application Data

(63) Continuation of application No. PCT/EP2011/000561, filed on Feb. 7, 2011.

(60) Provisional application No. 61/301,736, filed on Feb. 5, 2010.

(30) Foreign Application Priority Data

Feb. 5, 2010 (DE) .................. 10 2010 007 042

(51) Int. Cl.
 *B64C 21/08* (2006.01)
 *B64C 13/50* (2006.01)
 *B64C 21/04* (2006.01)

(52) U.S. Cl.
 CPC .............. *B64C 13/50* (2013.01); *B64C 21/04* (2013.01); *B64C 21/08* (2013.01); *Y02T 50/166* (2013.01)

(58) Field of Classification Search
 CPC ....... B64C 21/025; B64C 21/04; B64C 21/06; B64C 21/08; Y02T 50/168
 USPC .................................. 244/207–209
 See application file for complete search history.

(56) References Cited

U.S. PATENT DOCUMENTS

| | | | |
|---|---|---|---|
| 7,255,309 B2 * | 8/2007 | Boldrin | B64C 21/08 244/208 |
| 2006/0102801 A1 * | 5/2006 | Manley | 244/208 |
| 2007/0267548 A1 | 11/2007 | Ciholas | |
| 2009/0292405 A1 | 11/2009 | Najmabadi | |
| 2013/0035808 A1 | 2/2013 | Golling et al. | |

FOREIGN PATENT DOCUMENTS

| | | |
|---|---|---|
| DE | 10 2009 060 327 | 6/2011 |
| EP | 2 072 395 | 6/2009 |
| WO | WO 00/55036 | 9/2000 |

OTHER PUBLICATIONS

International Search Report for WO 2011/095360 dated May 17, 2011.
German Office Action for Application No. 10 2010 007 042.4 dated Oct. 9, 2013.

* cited by examiner

*Primary Examiner* — Brian M O'Hara
(74) *Attorney, Agent, or Firm* — Jenkins, Wilson, Taylor & Hunt, P.A.

(57) ABSTRACT

An aircraft with airfoils having a main wing and at least one control flap arranged such to be adjusted relative to the main wing, as well as a high-lift system with at least one regulating flap for adjusting the lift of the airfoils to adjust the state of lift of the aircraft, featuring flow control devices for influencing the fluid flowing over the surface segment; an activating unit; and a lift state specification device connected to the activating unit for adjusting the state of lift of the aircraft.

23 Claims, 5 Drawing Sheets

AIRCRAFT WITH A CONTROL DEVICE

CROSS-REFERENCE TO RELATED APPLICATIONS

This application is a continuation of and claims priority to PCT/EP2011/000561 filed Feb. 7, 2011 which claims the benefit of and priority to U.S. Provisional Application No. 61/301,736, filed Feb. 5, 2010 and German Patent Application No. 10 2010 007 042.4 filed Feb. 5, 2010, the entire disclosures of which are herein incorporated by reference.

The invention pertains to an aircraft with a control device.

Flow control devices that are integrated into the airfoils of an aircraft and intended to stabilize specified local aerodynamic flow conditions on segments of the airfoil are known from the general state of the art. This may concern, in particular, the reduction of turbulences on the airfoil so as to prevent a reduction of the local coefficient of lift in critical flight situations due to the formation of a local turbulent flow.

It is the objective of the invention to make available measures for improving the aerodynamic efficiency of controlled aircraft.

This objective is attained with the characteristics of claim 1. Other embodiments are defined in the dependent claims that refer to this claim.

According to the invention, an aircraft is provided with airfoils that respectively consist of a main wing and at least one control flap that is arranged such that it can be adjusted relative to the main wing, as well as a high-lift system with at least one regulating flap that serves for adjusting the lift of the airfoils and is arranged on the main wing such that it can be adjusted relative thereto by means of an actuating unit in order to adjust the state of lift of the aircraft, with said aircraft featuring

- at least one arrangement of flow control devices that is situated in a surface segment of the main wing that extends in the spanwise direction and/or at least one regulating flap of each airfoil and serves for influencing the fluid flow flowing over the surface segment,
- an actuating unit for actuating the regulating flaps,
- an activating unit that is functionally connected to and serves for controlling the actuators and the flow control devices in order to adjust the regulating flap and/or the degree, to which the flow is influenced by the flow control devices,
- a lift state specification device that is connected to the activating unit and serves for generating nominal commands for adjusting the state of lift of the aircraft,
- wherein the activating unit is realized in such a way that it generates commands for the actuating unit and the flow control devices based on nominal commands of a specification device in order to adjust the regulating flap and/or the degree, to which the flow is influenced by the flow control devices, and thusly adjust the state of lift of the aircraft. The specification device can in particular be an specification device which is function part of the input device of a pilot interface which has an input device and which is realized such that a pilot can manually select input commands with the input device. Further, the specification device can be realized as a lift state specification device which comprises an input device or module for selecting a value for the lift of the aircraft. In addition or alternatively, the specification device can be realized as a flow state specification device which comprises an input device or module for selecting a value for the fluid flow flowing over the surface segment, whereby the pilot can specifically select the magnitude of the influence of the fluid flow flowing over the surface segment and in particular the magnitude of values of the current control signal vector for speed and/or throughput of fluid being blown out of outlet openings of the flow control devices.

According to an embodiment of the invention, the activating unit comprises a prioritization function which generates amplifying factors for the commands for the actuating unit and for the flow control devices in order to adjust the magnitude of the commands for the actuating unit and the magnitude of the commands for the flow control devices in relation to each other.

In this regard, According to an embodiment of the invention the prioritization function is designed such that it generates the amplifying factors for the commands for the actuating unit and for the flow control devices in functional dependency of the nominal commands of the specification device and/or the sensor signals of the flight status sensor unit and/or the sensor signals of the flow condition sensor unit.

The flow control devices are realized, in particular, in such a way that they vary the local coefficients of lift or the ratios between the coefficient of drag and the coefficient of lift based on the nominal commands in the segment, in which they are respectively arranged.

The advantages attained with the invention can be seen in the following aspects:
- optional controlled short landing of the aircraft,
- suppression of the influence of gusts, turbulences and other unsteady flow conditions while landing,
- broadening of the possible flight envelope with respect to the angles of attack at a certain desired lift, drag or lift/drag ratio,
- consideration in the aircraft design can reduce the technical complexity and the weight of regulating flaps or trailing edge flaps or trailing edge devices for the high-lift system, wherein this also makes it possible to reduce the fairings, as well as to lower the drag and to improve the lift on the trailing edge device,
- increased effectiveness of control surfaces such that it is possible to utilize smaller control surfaces or to achieve a more agile flight performance,
- realization of slower approach speeds during the landing approach, i.e., shorter landing strips are required for aircraft of the same size.

The invention furthermore allows approach procedures, in which a large angle of approach is kept constant and the angle of attack is varied without thrust correction, if the coefficient of lift is regulated in conjunction with the coefficient of drag by adjusting the depth of separation on the trailing edge flap in the form of an adjustment of the variable volume/mass flow of the flow control system.

The invention furthermore allows an improved Design to Flight Procedures: respective adjustment of the coefficient of lift or coefficient of drag required for the flight status of the desired flight procedure by adjusting the volume/mass flow, i.e., adjustment to an effect variable such as, e.g., the coefficient of lift by varying the volume flow that realizes the disturbance flow under the given structural dimensions of the flow control system and the marginal conditions with respect to the integration of the actuator system into the structure.

In this case, it is possible to specify the degree, to which the flow is influenced by the flow control devices. This degree may be specified in dependence on the position of the regulating flap, i.e., functionally coupled thereto, or independently thereof and, in particular, constant. It would furthermore be possible that the activating unit generates commands for the actuators based on this degree and transmits these commands to said actuators in order to adjust the regulating flap.

According to one aspect of the invention for carrying out an adjustment, it is proposed that the at least one arrangement of flow control devices situated in a surface segment of the main wing that extends in the spanwise direction and/or at least one regulating flap of each airfoil additionally features flow condition sensor units for measuring the flow condition on the respective segment, and that the activating unit has a control function, by means of which this activating unit generates commands for the actuators and the flow control devices based on nominal commands of the flow control specification device or lift state specification device and the flow conditions measured by the flow condition sensor units in order to adjust the degree, to which the flow is influenced by the flow control devices.

According to the invention, the activating unit may be realized in such a way that it generates a current control signal vector comprising commands for controlling the actuating unit of the at least one regulating flap and the flow control devices by means of a controller model for the aircraft and transmits this control signal vector to the actuating unit and the flow control devices, wherein the activating unit determines the current input signal vector based on the nominal commands of the specification device, the sensor signals of the flight status sensor unit and the sensor signals of the flow condition sensor unit.

According to a further embodiment of the invention, the function of the activating unit which generates a current control signal vector for controlling the actuating unit of the at least one regulating flap and the flow control devices comprises a matrix operation with a current input signal vector, a factorization matrix comprising factors, wherein the current control signal vector is generated based on the multiplication of the current input signal vector with the factorization matrix, wherein the current input signal vector in particular comprises the nominal commands of the specification device and/or the sensor signals of the flight status sensor unit and/or the sensor signals of the flow condition sensor unit.

According to the invention, the input signals for the activating unit can be generated with a function that determines these signals in accordance with an aerodynamic characteristic. In this case, it would be possible, in particular, to realize the activating unit in such a way that the nominal commands for the actuators and the flow control devices are determined in accordance with or based on a characteristic for the lift or for the ratio between the coefficient of drag and the coefficient of lift and generated based on nominal commands of the flow control specification device or lift state specification device and/or based on the flow conditions measured by the flow condition sensor units in order to adjust the regulating flap and/or the degree, to which the flow is influenced by the flow control devices.

In this respect, the flow control specification device or lift state specification device may feature a device for selecting an automatic operating mode, by means of which a characteristic for the lift or for the ratio between the coefficient of drag and the coefficient of lift is generated in order to adjust the state of lift of the aircraft. This makes it possible, in particular, to respectively implement an operating mode for a steep approach (steep approach) and/or for a short landing (short landing) and/or for a slow flight phase (slow flight) and/or for a normal approach (normal approach) and to select the respective operating mode via a pilot interface or the specification device.

According to the invention, the flow control specification device or lift state specification device may feature a device for the manual actuation thereof, by means of which a value for the lift or for the ratio between the coefficient of drag and the coefficient of lift or an adjustment that corresponds to such a characteristic for adjusting the state of lift of the aircraft is generated in order to adjust an aerodynamic lift behavior of the airfoils, wherein nominal commands for activating the actuators for adjusting the regulating flap and nominal commands for adjusting the degree, to which the flow is influenced by the flow control devices, are generated from said characteristic.

According to another aspect of the invention, a selection of the flow control devices can be carried out. In this respect, the aircraft may feature:

a state of adjustment sensor unit that serves for detecting the adjusting position of the regulating flap and the input side of which is functionally connected to the activating unit, a flight status sensor unit that serves for detecting flight statuses of the aircraft and is functionally connected to the activating unit, wherein the activating unit has a function that carries out a selection of the flow control devices to be actuated in order to optimize local coefficients of lift on the airfoil in dependence on the flight status and generates commands for the actuators and the flow control devices based on nominal commands of the flow control specification device or lift state specification device in order to adjust the state of lift of the aircraft.

In the embodiments of the invention, the regulating flap may consist of a high-lift flap that is arranged on the airfoil of the aircraft, wherein the arrangement of flow control devices and of flow condition sensor units is arranged on the high-lift flap and/or on the main wing.

According to the invention, it would alternatively or additionally be possible that the flow control device of a main wing or the regulating flap is composed of a pressure chamber that is arranged in the main wing and/or the regulating flap and serves for accommodating pressurized air, an outlet chamber with outlet openings, one or more connecting lines for connecting the pressure chamber to the outlet chamber and at least one valve that is integrated into the connecting line and functionally connected to the flight control unit. In this case, it would be possible, in particular, that the activating unit activates the valve by means of the current control signal vector in order to block the air under pressure situated in the pressure chamber from flowing through the outlet openings or to allow this air to flow through the outlet openings with a corresponding speed and/or throughput in accordance with the control values of the current control signal vector and to thusly influence the flow around the surface of the main wing or the regulating flap.

According to one exemplary embodiment of the invention, the activating unit may have a segment activating function that is realized such that it generates control commands for the flow control device of each segment and/or control commands for the actuator of the control flap or regulating flap based on the control signals of the activating unit, namely by means of an optimization with consideration of the currently available power and/or dynamics of the flow control device and/or of the actuator of the regulating flap.

According to the invention, the at least one segment may be composed of several segments that are arranged in succession referred to the spanwise direction.

According to one exemplary embodiment of the invention, the arrangement of flow control devices may be composed of discharge openings that are arranged in one segment or several segments and a flow generating device that is arranged in the wing and intended, in particular, for discharging and/or removing air by suction from the respective flow surface of the respective segment, wherein said flow generating device discharges fluid from the discharge openings in order to influence the coefficient of lift that locally occurs on the segment. The arrangement of flow control devices may additionally feature intake openings that are arranged in one segment or several segments and a suction device that is arranged in the wing and fluidically connected to the intake openings, wherein said suction device takes in fluid from the intake openings in order to influence the coefficient of lift that locally occurs on the segment.

According to the invention, it would also be possible that the arrangement of flow control devices is composed of loudspeakers that are arranged in one segment or several segments and the activation of which makes it possible to influence the coefficient of lift that locally occurs on the segment by generating air oscillations.

According to the invention, it would furthermore be possible that the arrangement of flow control devices is composed of piezoelectric actuators that are arranged in one segment or several segments on the surface of the wing and the activation of which makes it possible to influence the coefficient of lift that locally occurs on the segment by generating air oscillations.

According to another exemplary embodiment of the invention, the activating unit may have a safety function with:
- a monitoring function that compares the values of the sensor signals with nominal values and detects any deviation that exceeds a specified maximum deviation value,
- a reconfiguration function that, in case of the detection of such a deviation that exceeds the maximum deviation value, switches over from the operating mode, in which current control signal vectors or control commands for controlling the actuators of the regulating flaps and the flow control devices are generated, to a safety mode, in which only the regulating flaps are actuated in accordance with the respective nominal commands in order to adjust a predetermined state of lift of the aircraft.

It would also be possible that a comparison function is integrated into the activating unit C in order to form the deviation for checking the functionality, wherein said comparison function provides the options of carrying out a nominal-actual comparison by means of a subtraction or of forming a ratio between nominal values and actual values.

According to one exemplary embodiment of the invention, the high-lift system may feature a pilot interface with a display device, on which a failure of a part of the flow condition sensor unit and/or a switch-over to the safety mode is displayed. The invention is described below with reference to the enclosed figures, in which.

Figure 3:
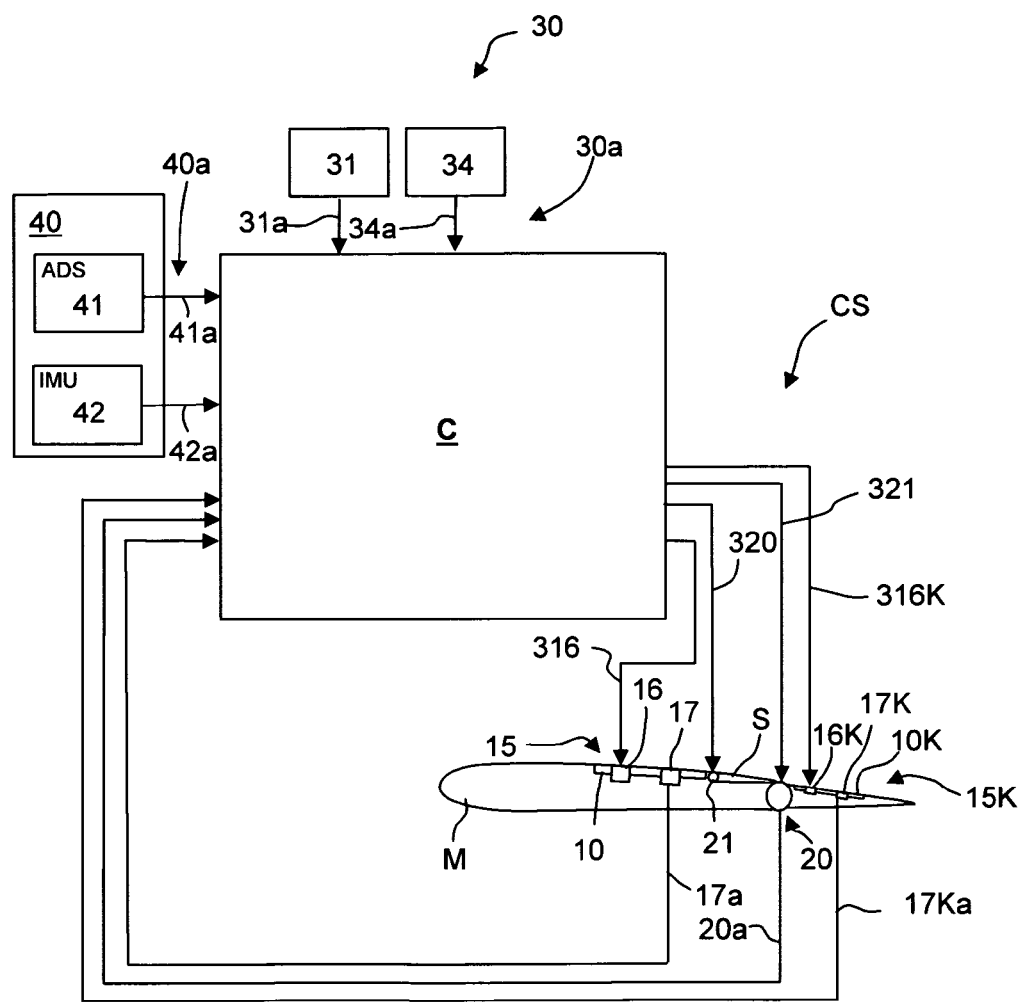
Figure 4:
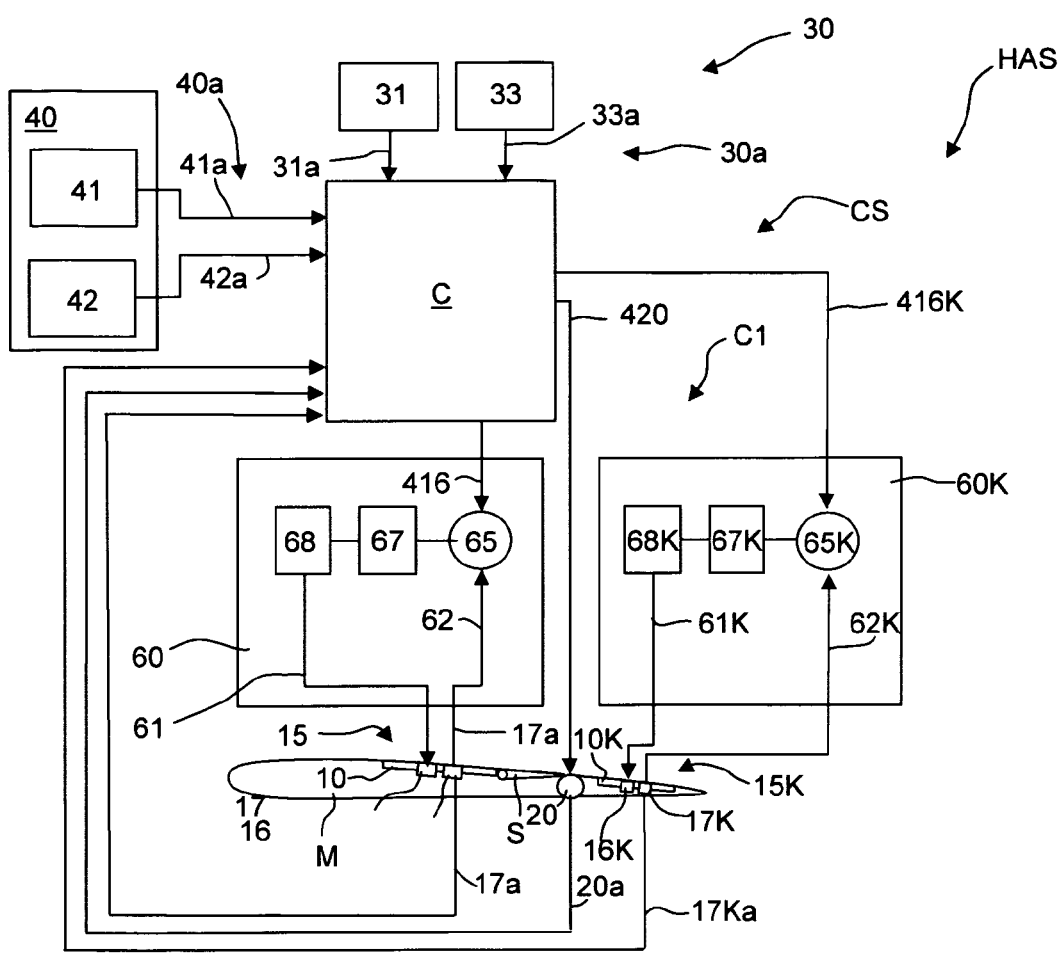
Figure 5:
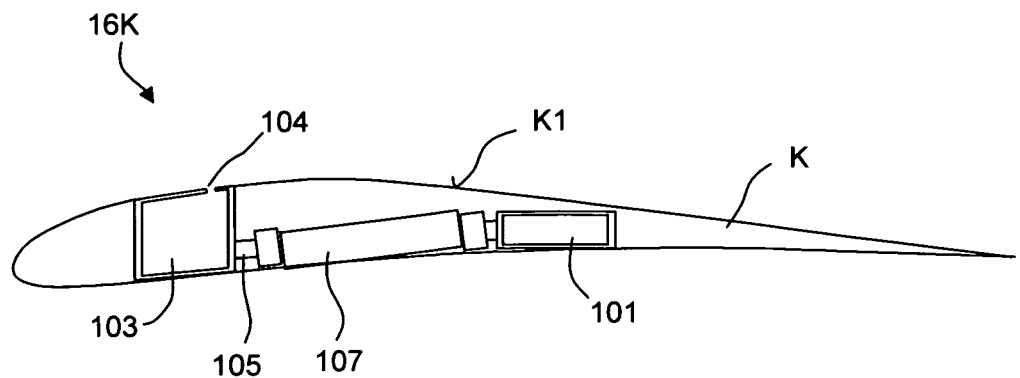
Figure 6:
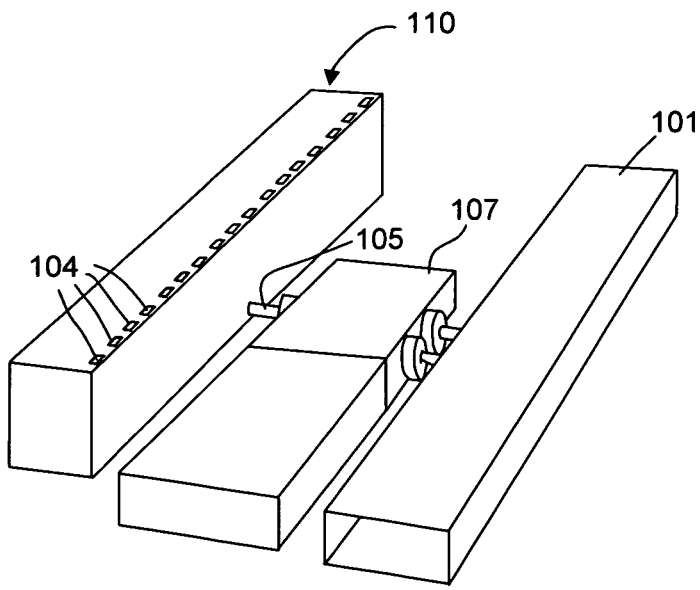
Figure 7:
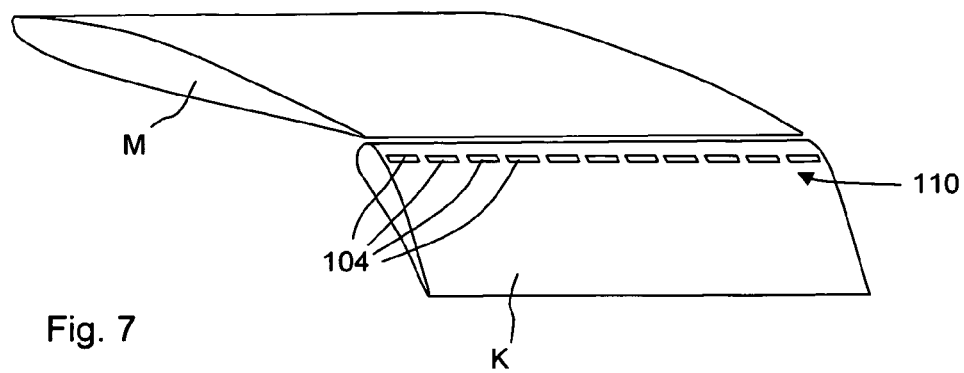
Figure 8:
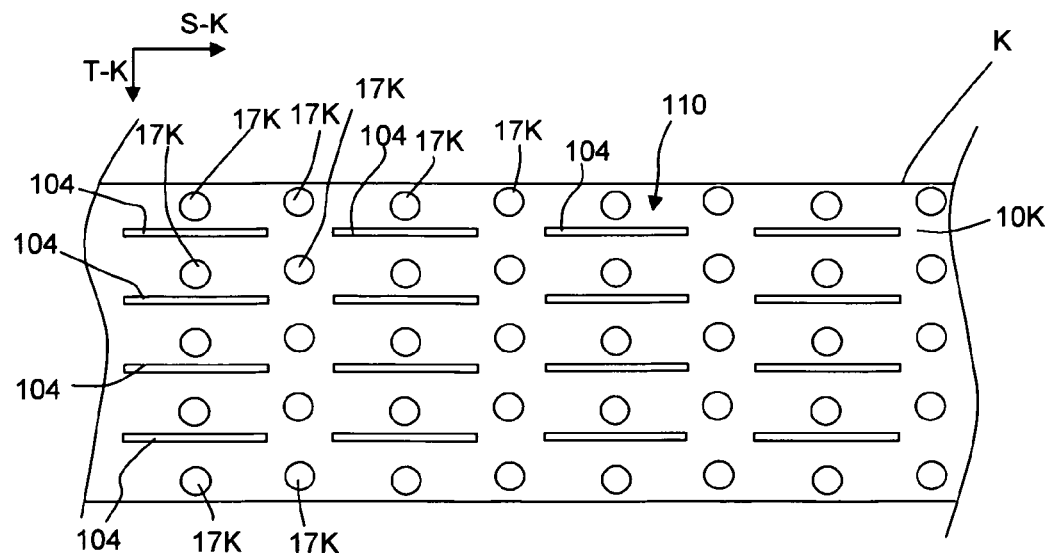

FIG. 3 shows an exemplary embodiment of the inventive high-lift system with an activating unit that generates control commands for activating the flow control device of each segment and/or the drive unit for adjusting the regulating flap based on sensor signals of a flight status sensor unit and sensor signals of the flow condition sensor unit of each segment and transmits these control commands to said devices;

FIG. 4 shows another exemplary embodiment of the inventive high-lift system with an activating unit that is assigned a flow condition controller, wherein the flow condition control unit generates flow condition control commands for activating the flow control device of each segment based on the input signals of the flight status control unit and based on the sensor signals of the flow condition sensor unit of each segment and transmits these flow condition control commands to said devices;

FIG. 5 shows a sectional representation of an exemplary embodiment of the inventive flow control device that is installed, for example, in a regulating flap;

FIG. 6 shows a schematic perspective representation of the flow control device illustrated in FIG. 4;

FIG. 7 shows a schematic representation of an airfoil with a main wing and a regulating flap in the form of a high-lift flap that is coupled to the main wing and on the upper side of which an inventive arrangement of discharge openings of a flow control device is arranged, and FIG. 8 shows a top view of a surface segment of a regulating flap with an exemplary arrangement of flow control devices and flow condition sensor units.

In the respective figures, components with identical or similar function are identified by the same reference symbols.

Figure 1:
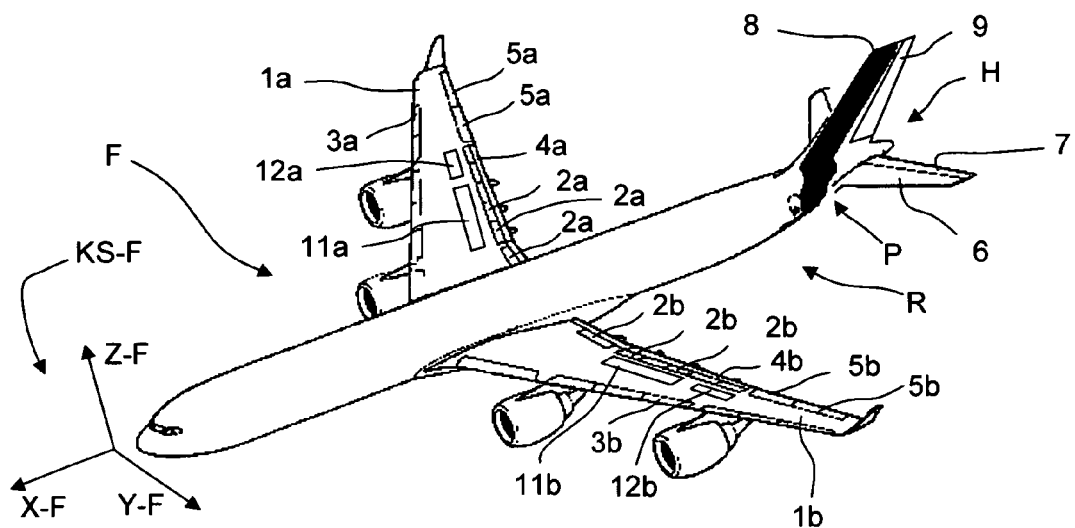
FIG. 1 shows a perspective representation of an aircraft with the integrated high-lift system according to the invention and the flow control device integrated therein.

The exemplary embodiment of a controlled aircraft F according to FIG. 1, in which the invention can be utilized, has a conventional design with two airfoils $1a$, $1b$ that respectively feature at least one aileron $5a$ and $5b$. Each airfoil $1a$, $1b$ of the aircraft shown in FIG. 1 furthermore features three leading edge lift bodies $3a$, $3b$ and three trailing edge lift bodies $4a$, $4b$ in the form of high-lift flaps. In addition, the respective airfoils $1a$, $1b$ may be optionally provided with a plurality of spoilers $2a$, $2b$. The aircraft F is furthermore provided with an empennage H that features a rudder unit 8 with a rudder 9 and an elevator unit 6 with at least one elevator 7. The elevator unit 6 may be realized, e.g., in the form of a T-shaped tail unit or in the form of a cruciform tail unit as shown in FIG. 1.

Figure 2:
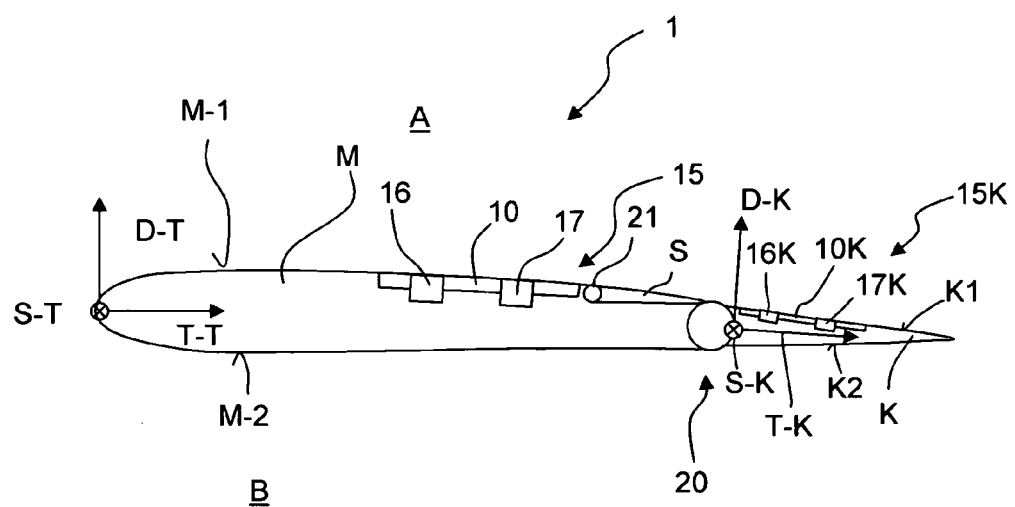
FIG. 2 shows a schematic representation of the cross section of an airfoil with an arrangement of flow control devices and flow condition sensor units that, according to the invention, is arranged in at least one segment thereof, as well as a regulating flap or high-lift flap that can be adjusted by an adjusting device with an actuator.

In FIG. 1, a coordinate system KS-F related to the aircraft F is plotted with a longitudinal aircraft axis X-F, a lateral aircraft axis Y-F and a vertical aircraft axis Z-F. Each airfoil $1a$, $1b$ may be assigned an airfoil coordinate system KS-T with an axis S-T for the spanwise direction, an axis T-T for the chord direction and an axis D-T for the thickness direction of the airfoil (FIG. 2). In addition, each flap may be assigned a flap coordinate system KS-K with an axis S-K for the spanwise direction of the flap, an axis T-K for the chord direction and an axis D-K for the thickness direction of the flap (FIG. 2).

The inventive aircraft F may also have a different shape and feature a different arrangement of regulating flaps than the aircraft F illustrated in FIG. 1.

FIG. 2 schematically shows an airfoil 1 that is composed of a main wing M, a control flap S provided for controlling or maneuvering the aircraft and a high-lift flap or generally regulating flap K. Although the control flap S is illustrated in the form of a spoiler in FIG. 2, it could alternatively or additionally consist of an aileron or—even if it is not arranged on the main wing—an elevator 7 and/or a rudder 9 in order to fulfill the inventive function.

FIG. 2 shows a detailed representation of a main wing M with a regulating flap K that is coupled to the main wing M. According to the invention, the aerodynamic body may consist of the regulating flap K, i.e., an aerodynamic body that is adjustably arranged on the aircraft such as, e.g., the regulating flap illustrated in FIG. 1, namely a high-lift flap, an aileron, a spoiler, an elevator or a rudder. The aerodynamic body provided in accordance with the invention may also consist, in particular, of a main wing M. The main wing M has an upper side M-1 that extends on its suction side, an underside M-2 that extends on its pressure side B and, if applicable, a rear side that faces of the high-lift flap. A flap chord direction T-K or generally chord direction, a spanwise direction S-K or generally spanwise direction and a flap thickness direction D-K or generally flap thickness direction are defined for the high-lift flap or generally for the regulating flap K or the aerodynamic body. The regulating flap K or high-lift flap features an upper side K1 that extends on the suction side A of the high-lift flap K and an underside K2 that extends on the pressure side B of the high-lift flap K.

In order to further elucidate the invention, the following portion of the description refers to the combination of a main wing M, at least one spoiler in the form of a control flap S and a high-lift flap in the form of a regulating flap K that is schematically illustrated in FIG. 2. In this embodiment, the at least one control flap S may, in particular, also consist of an aileron and/or a rudder. Alternatively or additionally to the high-lift flap, it would also be possible to functionally incorporate a regulating flap K in the form of the tail plane and/or the rudder unit and generally also a regulating flap of the aircraft according to the invention.

According to the invention, an aircraft F is provided with airfoils 1a, 1b and a high-lift system HAS. The airfoils 1a, 1b respectively feature the main wing M and at least one control flap S that is arranged such that it can be adjusted relative to the main wing and serves for controlling or adjusting the flight attitude of the aircraft. The high-lift system HAS features at least one regulating flap K that is arranged on the main wings M such that they can be adjusted relative thereto and serves for adjusting the lift of the airfoils 1a, 1b and therefore for adjusting the state of lift of the aircraft.

The high-lift system HAS furthermore features an activating unit C that is realized such that it generates control commands for controlling the respective drive unit 20 of the regulating flaps K, e.g., the high-lift flap, as well as flow control devices 16 or 16K arranged on the airfoil 1a, 1b, 1 and/or on at least one regulating flap K of each airfoil or their actuators, and transmits these control commands to said devices (FIG. 3). It would optionally also be possible that the activating unit C generates control commands for activating the actuators 21 of the control flaps S based on control functions that, in turn, are based on control specifications and input signals transmitted by the flight status sensor units and transmits these control commands to said actuators. In this case, the activating unit C represents an integrated function for generating a control command vector in order to control the aircraft and to adjust the high-lift state of the aircraft. In addition to the activating unit C, it would alternatively also be possible to provide a flight control unit that generates control commands for activating actuators 21 of the control flaps S based on control functions that, in turn, are based on control specifications and input signals transmitted by the flight status sensor units and transmits these control commands to said actuators.

The drive units 20 for actuating the regulating flaps K may be realized in the form of actuators that are coupled to the regulating flaps K. These actuators may be realized, e.g., in the form of decentralized drive units such that at least one actuator is respectively coupled to one regulating flap K. Alternatively, the actuating unit may consist of a drive unit that is arranged centrally, i.e., in the fuselage of the aircraft F, and coupled to the regulating flaps K via drive trains or drive shafts in order to drive and move the regulating flaps during their adjustment. The actuating unit or the drives may be realized in the form of hydraulic or electric drives that are provided with their input power by a corresponding supply system and actuated based on the control commands or control signals generated by the activating unit C in order to move the regulating flaps K.

The flow control devices 16, 16K are controlled by the activating unit C, in particular, by means of control commands or a current control signal vector and may be arranged on the main wing M and/or at least one regulating flap K. In this case, an arrangement consisting of a flow control device 16; 16K and at least one flow condition sensor 17 and 17K may be arranged in at least one corresponding surface segment or in a segmental fashion on the main wing M and/or on at least one regulating flap K. According to FIG. 2, an arrangement 15 or 15K consisting of at least one flow control device 16 or 16K and at least one flow condition sensor 17 or 17K is respectively arranged in a segment 10 on the upper side M-1 of the main wing and a segment 10K on the upper side K1 of the regulating flap K. In FIG. 1, corresponding segments 11a, 11b, 12a, 12b, in which such an arrangement 15 consisting of at least one flow control device 16 and at least one flow condition sensor 17 is respectively arranged, are schematically illustrated on the main wings of the airfoils. Such a segment 10K with an arrangement 15K consisting of at least one flow control device 16K and at least one flow condition sensor unit 17K may alternatively or additionally be arranged on the upper side K1 or underside K2 of the respective regulating flap K as illustrated in FIG. 2.

The surface segment 10, 10K may generally be a fictitious region or a material section that is arranged in or integrated into the respective surface M-1, M-2, K1, K2.

The activating unit C determines the current control commands or a current control signal vector CS, particularly in the form of a control signal vector, based on the nominal specifications 30a of the specification device 30, as well as optionally the sensor signals 40a of the flight status sensor unit 40 and optionally the sensor signals of the flow condition sensor unit 17, 17K. The nominal specifications 30a in the form of input signals for the activating unit C may correspond to a nominal state of lift, a nominal angle of attack, a nominal angle of approach, an aerodynamic characteristic such as the ratio between the coefficient of lift and the coefficient of drag, a nominal acceleration and/or a nominal direction for the aircraft or a combination of these values or be derived from these values or a combination thereof and generally define a nominal state of the aircraft. The activating unit C is realized in such a way that it generates a current input signal vector CS for controlling the actuator 21 and the flow control devices 16; 16K based on the nominal specifications 30a and transmits this current input signal vector, at which the aircraft assumes a nominal state that corresponds to the nominal specifications 30a, to the actuator and the flow control devices.

The flow control device 16 or 16K is realized in such a way that it can influence the laminar flow on the respective surface and consequently the respective coefficient of lift of the main wing M and the regulating flap K based on the control commands CS or a current control signal vector CS. In this case, the activating unit C may have a function that selects the flow control devices 16; 16K to be actuated in dependence on the flight status and the nominal specifications or target values 30a in order to optimize the local coefficients of lift. In one exemplary embodiment, the activating unit C determines local nominal flow condition values, in particular, by means of a control unit in a segmental fashion, i.e., the current control signal vector CS contains control signals for each of the segments 10, 10K that can be activated.

In this case, the control command CS or the current control signal vector CS may be formed in such a way that it contains a value for all flow control devices 16, 16K that can be actuated, wherein the flow control devices 16, 16K that, based on the selection and the respective current control signal vector CS, should not be actuated receive the control value zero.

In this case, the activating unit C may be realized, in particular, in such a way that it generates a current control command CS or a current control signal vector CS for controlling the actuator 20 of the at least one regulating flap K and the flow control devices 16, 16K by means of a control unit or by means of a model for the aircraft or an observer model and transmits the current control command or current control signal vector to the actuator and the flow control devices, wherein the activating unit C determines the current control command CS or the current control signal vector CS based on the nominal commands 30a of the specification device 30, as well as optionally the sensor signals 40a of the flight status sensor unit 40 and optionally the sensor signals of the flow condition sensor unit 17; 17K.

The respective sensor signals 17a and 17Ka determined by the flow condition sensor units 17; 17K are fed back to the activating unit C. The adjusting position of the regulating flap S determined by means of a corresponding sensor unit is also fed back to the activating unit C in the form of a sensor signal 20a. Based on these feedbacks, the state of lift of the airfoil can be controlled in accordance with the nominal specifications 30a in the activating unit C.

According to one embodiment of the invention, the aircraft F or high-lift system HAS is provided with a flight status sensor unit 40 that is functionally connected to the activating unit C and features an air data sensor unit 41 (Air Data System, ADS) that acquires flight status data in order to determine the flight status, as well as a flight attitude sensor unit or an inertial sensor unit 42 (Inertial Measurement Unit, IMU) that detects the flight status of the aircraft F and, in particular, the rates of rotation of the aircraft F. The air data sensor unit 41 features air data sensors for determining the flight status of the aircraft F and, in particular, the dynamic pressure, the static pressure and the temperature of the air flowing around the aircraft F. The flight attitude sensor unit 42 determines, in particular, the rates of rotation of the aircraft F including the rates of yaw and the rates of roll of the aircraft in order to determine the flight attitude thereof. The flight control unit receives the flight status sensor signals 40a of the sensor values acquired by the flight status sensor unit 40, particularly the air data sensor signals 41a of the air data sensor unit 41 and the flight attitude sensor data 42a of the flight attitude sensor unit 42.

The flow condition sensor units 17; 17K, as well as the flight status sensor units 40, therefore generate sensor data streams in the form of input signals for the activating unit and, in particular, the control unit. From these input signals, the activating unit generates the corresponding control variables for the actuation of the flow control system or the flow control devices 16; 16K and of the regulating flaps and therefore reacts to and compensates changing flow condition in real time or in time intervals. In this case, the control unit controls the degree, to which the flow is influenced by the flow control devices 16; 16K, the selection and therefore also the number of the respectively activated flow control devices 16; 16K and the position of the regulating flaps K in real time or in time intervals. Consequently, the local coefficients of lift or the ratios between the coefficient of drag and the coefficient of lift are changed based on the nominal specifications 30a in the segment 10, in which these components are respectively arranged.

However, it would generally also be possible that the activating unit A generates the control commands CS based on a model of the aircraft F or of the airfoil, as well as based on the nominal specifications 30a and, if applicable, the sensor signals 40a.

The activating unit may be realized in such a way that the commands for the actuators and the flow control devices 16; 16K are determined based on a characteristic for the lift or for the ratio between the coefficient of drag and the coefficient of lift or a variable that corresponds to such a characteristic and generated based on nominal specifications 30a of the specification device 30 and/or based on the flow conditions measured by the flow condition sensor units in order to adjust the regulating flap K and/or the degree, to which the flow is influenced by the flow control devices 16; 16K. In this case, the activating unit may be realized in such a way that these characteristics for the lift or for the ratio between the coefficient of drag and the coefficient of lift are stored in the activating unit. In this context, the aforementioned characteristics of the respective table could also be referred to as control characteristics or control variables. These characteristics may be generated, in particular, based on calibrations and stored in the activating unit in the form of tables or matrices or value series that respectively contain values for a lift to be attained.

The value of the lift to be attained may respectively correspond, in particular, to a coefficient of lift or a ratio between the coefficient of drag and the coefficient of lift or be derived from one of these values. The value of a lift to be attained generally is an amount or a value that causes a flight status corresponding to the nominal specifications 30a to be adjusted and is determined experimentally and/or analytically, wherein said value may, in particular, also correspond to a local coefficient of lift referred to the airfoil or to a ratio between the coefficient of drag and the coefficient of lift or to a lift/drag ratio in a surface segment or be derived from one of these values.

The activating unit may have a function that determines the relevant value for the lift to be attained at the respective time by means of the stored characteristics for the lift or for the ratio between the coefficient of drag and the coefficient of lift, namely based on the nominal specifications 30a of the flow control specification device or lift state specification device 30 and/or based on the flow conditions measured by the flow condition sensor units 17; 17K.

The activating unit may furthermore have a function for determining control commands that determines the control command CS or a current control signal vector CS from the determined relevant value for the lift to be attained at the respective time by means of a controller and/or an observer function. Such an observer function may contain a mathematical model of an aircraft, by means of which the activating unit determines the value for the lift to be attained at the respective time, the control command CS or a current control signal vector CS, at which the aircraft assumes flight statuses that correspond to the control commands or control signal vectors CS, based on input data in the form of nominal specifications 30a.

It would alternatively also be possible that the activating unit is designed in the form of a dynamic system and has functions for realizing an adaptive or trainable system, wherein this system is designed in such a way that it determines a dataset, of which a current input signal vector CS or control commands CS for a comparable flight status or a comparable operating mode with such flight statuses is used, based on the operation of the aircraft and the measured flight statuses occurring during the operation of the aircraft, namely by executing a predetermined flight profile once or repeatedly and optionally with consideration of external ambient conditions such as, e.g., wind speeds, frequency of gusts or air status parameters. As described above, a table of numerical values that is used by the activating unit for determining the current input signal vector CS or the control commands CS can be prepared from the values of such a dataset. For this purpose, it would be possible, in particular, to implement a neuronal network in the activating unit in order to realize an adaptive activating unit in the aforementioned sense. Such an activating unit may contain a base dataset that the activating unit utilizes during flight statuses or operating modes, to which the activating unit should be adjusted or optimized with respect to the generation of current input signal vectors CS or nominal commands CS. In this case, the activating unit may furthermore be realized such that it is used for executing flight statuses or flight profiles such as, e.g., special approach profiles. In this case, it would be possible, in particular, to execute certain flight profiles such as, e.g., certain approach procedures between start1 and destination1 and between start2 and destination2 several times, particularly always along the same route, and to subsequently determine optimized characteristics for the table for determining control signal or input signal vectors CS or control commands CS thereof. In this context, it would also be possible to determine this table based on the execution of the respective flight profile if measured values are acquired by the aircraft and/or an external device such as an air-based or ground-based flight monitoring or flight testing device. The acquisition of measured values by the aircraft may be realized, in particular, by acquiring flight status variables and/or local flow condition variables with the aid of the flow condition sensor units 17; 17K. In this way, the activating unit C is realized in the form of a dynamic but deterministic system that accesses a base dataset as an "adaptive system," but determines and stores data that is adapted or optimized with respect to special approach conditions such as always flying along the same route during the operation of the aircraft in order to generate control signal or input signal vectors CS or nominal commands CS or to define a control, optionally with the aid of an external optimization unit, wherein the activating unit subsequently accesses this optimized data in an automated fashion during normal operations.

In these embodiments of the activating unit C, this device may be realized such that it carries out an adjustment or calibration of characteristics of a table of the activating unit with a base dataset of the characteristics based on the actual execution of flight statuses or operating modes such as, e.g., flight profiles of landing procedures, optionally with the aid of an external optimization unit, such that current control signal or input signal vectors CS or nominal commands CS are optimally generated during normal flight operations with this adjusted or calibrated table of characteristics. Such an external optimization unit may feature an aircraft model and optionally also a model of the activating unit, by means of which the table of characteristics for generating control signal or input signal vectors CS or nominal commands CS is prepared with the aid of optimization methods. Such a table can be prepared based on the execution of different flight profiles or landing profiles and implemented in the activating unit. In this case, it would be possible, in particular, that the characteristics of the table are determined based on the constellations of nominal specifications 30a, measured local flow conditions and measured flight statuses occurring in the different executed flight profiles. The activating unit C may be realized, in particular, such that it determines current input signal vectors CS or nominal commands CS based on the respectively input nominal specifications 30a, the measured local flow conditions and the measured flight statuses.

As described above, the table of characteristics for generating control signal or input signal vectors CS or nominal commands CS is prepared experimentally and optionally with supplementary mathematical methods and a disturbance variable analysis such that the activating functions are stable referred to disturbances and the flight statuses that correspond to the nominal specifications 30a are reliably attained if gusts and/or turbulences occur. In the embodiment of the activating unit C with a control, the activating unit is realized so stable that it adjusts the flight statuses to be primarily attained with the stored tables of values described above and detects and compensates these disturbing secondary flow conditions that are caused, e.g., by gusts and/or turbulences.

In this case, it would be possible to distinguish the local flow condition changes caused by disturbances in the air flow such as gusts and/or turbulences from the flow condition changes occurring due to the controlled flight status changes such that a special gust abatement function may be implemented in the activating unit in order to compensate disturbances such as gusts and/or turbulences, wherein said gust abatement function correspondingly modifies the control commands CS in order to compensate disturbances in the airflow such as gusts and/or turbulences. Disturbances in the airflow such as gusts and/or turbulences can be distinguished from flow condition changes occurring due to the controlled flight status changes by comparing the flow condition changes with the respectively controlled nominal specifications 30a and with the aid of an aircraft model that is implemented in the activating unit, wherein said airplane model determines nominal flight status changes occurring due to the nominal specifications 30a and compares these nominal flight status changes with the actually occurring local and measured flow condition changes.

Alternatively, it would also be possible to realize the control in the form of a complete control that determines the flight statuses in accordance with the nominal specifications 30a based on an aircraft model or an observer and based on the flight status sensor data 40a and the flow condition sensor data and compensates each of these aforementioned disturbances.

According to one inventive embodiment of the inventive high-lift system or aircraft, sensors in the form of the flow condition sensor units 17; 17K and the flight status sensor units 40 generate sensor data streams that are fed to the activating unit C and, in particular, a control function and/or an observer. From these sensor data streams, the activating unit C according to the invention determines the corresponding control commands or control variables for the flow control system or the flow control devices 16, 16K and for the actuating unit or the drive unit of the regulating flap K. In this way, the inventive device reacts to and compensates changing flow conditions in real time or nearly in real time and a determined or predetermined nominal state of lift is attained and maintained. Consequently, the inventive high-lift system features a flow control system with flow actuators in the form of the flow control devices 16; 16K and an optional subsystem in the form of flow condition sensor units 17; 17K. In this case, a control unit could be provided that controls the adjusting position or adjusting movement of the regulating flap K and/or the degree, to which the flow is influenced by the flow control devices 16, 16K.

According to the invention, it would also be possible that the activating unit C is functionally connected to a pilot interface in such a way that the adjusting position of the regulating flap K and/or the degree, to which the flow is influenced under the control or effect of the flow control devices 16, 16K, is displayed on the pilot interface.

According to one embodiment of the invention, the flow control devices 16; 16K are realized in the form of fluid discharge devices. In this case, the volume flow of the fluid discharged from the discharge openings of the flow control devices 16; 16K can be controlled with the control commands CS. Due to the control of the regulating flaps K, it is also possible to adjust the size of the gap between the main wing M and the regulating flap K if the regulating flaps K are correspondingly arranged on the main wing M.

The flow control device 16 or 16K is realized in such a way that it can influence the laminar flow on the respective surface and therefore the respective coefficient of lift of the main wing M and the regulating flap K.

In this case, the flow control device 16 or 16K also makes it possible, in particular, to adjust the degree, to which the laminar flow on the respective surface can be influenced. According to one exemplary embodiment, the flow control device 16 or 16K is composed of a (not-shown) opening and a (not-shown) flow generating device or flow conveyor drive that generates a discharge or suction flow of air through the opening. In this case, the flow conveyor drive may be installed or integrated into a channel connected to the opening and either operate with a fixed adjusted power or be realized such that it varies or controls the suction pressure and/or the discharge pressure and/or the differential pressure based on a corresponding activation by an activating function.

The flow control device 16 or 16K may alternatively or additionally feature a discharge opening variation device or suction opening variation device that is arranged at the location, at which the opening of a channel situated in the interior of the main wing M and the regulating flap K leads into the surroundings on the surface thereof, wherein the channel leads into or out of the main wing M and the regulating flap K at a different location. In this way, the respective quantity of air flowing through the opening can be controlled or adjusted by means of the discharge opening variation device or suction opening variation device.

The flow condition sensor unit 15 or 15K may feature one or more sensors for detecting the flow condition of the laminar or separated flow on the upper side of the high-lift flap. In this case, the sensor or sensors may consist of a resistance wire sensor for detecting the flow speed. The sensor or sensors may furthermore consist of a piezoelectric wall shear stress sensor for detecting the wall shear stress. In this case, the sensor or sensors for detecting the wall shear stress may consist of a hot-film sensor.

The sensor or the sensors may generally consists of a sensor for detecting the flow condition properties on the upper side of the main wing M and the flap K, wherein said sensor or sensors is/are realized in such a way that the flow condition can be positively determined with the aid of the signal generated by the sensor, i.e., it can be determined whether a laminar or separated flow is present and can be detected or measured.

It would furthermore be possible that the flow condition sensor unit 17 or 17K is arranged in the aforementioned channel in the interior of the flap K in order to detect flow conditions in a channel or several channels in the high-lift flap and/or in the main wing by means of a corresponding sensor unit, wherein said flow condition sensor unit forwards these flow conditions to the high-lift flap adjusting unit in the form of flow values in order to control the flow conditions and to change the activation or control of devices for influencing the flow.

One exemplary embodiment of the inventive flow control device 16, 16K of a segment is illustrated in FIG. 5 in the form of an exemplary flow control device 16K of a regulating flap K. In this case, the flow control device 16K is composed of a pressure chamber 101 for accommodating air under pressure, an outlet chamber or discharge chamber 103 and one or more connecting lines 105 for connecting the pressure chamber 101 to the outlet chamber 103. The discharge chamber 103 features at least one outlet opening or discharge opening, preferably an arrangement 110 of outlet openings or discharge openings. In FIG. 5, a single discharge opening 104 is illustrated for exemplification purposes only. At least one valve 107 is integrated into the at least one connecting line 105 and functionally connected to the activating unit C. The activating unit C controls the valve 107 by means of the current control signal vector or control commands 316, 316K, 416, 416K in order to block the air under pressure situated in the pressure chamber 101 from flowing into the outlet chamber 103 or to allow said air to flow into the outlet chamber with a corresponding speed and/or throughput in accordance with the control values of the current control signal vector or control commands 316, 316K, 416, 416K, wherein the air is subsequently discharged from the outlet chamber through an arrangement 110 of discharge openings in order to influence the flow around the surface K1 of the regulating flap K.

Compressed air can be introduced into the pressure chamber 101 in different ways, particularly by means of a pressure generating device. In this case, it would be possible to withdraw the compressed air from the external flow in an impact pressure region on the surface of an aerodynamic body of the aircraft, particularly on the regulating flap or the main wing. A pressure generating device or a pump or a flow variator may also be connected to the pressure chamber in order to receive the air via a supply line. The supply line may originate, in particular, at an opening or an arrangement of openings on the upper side of the main wing M or the flap K. This opening may be arranged in one location or an arrangement of openings may be distributed over the region of the main wing M and/or the flap K, namely such that suction effects occurring at these locations correlate to the discharge effects generated on the arrangement 110 of discharge openings in a predetermined fashion.

The flow control device 16K that is illustrated in the installed state in FIG. 5 is schematically illustrated in the form of a structurally isolated device in FIG. 6. FIG. 6 schematically shows an airfoil with a main wing M and a regulating flap K in the form of a high-lift flap that is coupled to the main wing and features an inventive arrangement 110 of discharge openings on its upper side.

The arrangement 110 of discharge openings or the opening device preferably consists of an arrangement of, in particular, slot-shaped openings (FIGS. 6 to 8). According to the invention, it is preferred to distribute the discharge openings that are fluidically connected to one or more discharge chambers over a surface segment of the aerodynamic body of the aircraft. In this case, several surface segments may be arranged adjacently or successively referred to the flow direction S so as to influence the flow over a larger region of the aerodynamic body. The activating unit C determines the control commands and corresponding control values for each arrangement 15, 15K of flow control devices 16 and 16K and flow condition sensor units 17 and 17K of each controllable segment 10, 10K of the segments 10, 10K that are distributed over the aerodynamic body, e.g., over the main wing and/or at least one regulating flap K, and features such arrangements 15, 15K of flow control devices 16 or 16K and flow conditions sensor units 17 or 17K.

FIG. 8 shows a top view of an exemplary surface segment 10K with an arrangement 15K of flow control devices and flow condition sensor units as it may be generally arranged in a surface segment of the main wing or a regulating flap K or generally an aerodynamic body of the aircraft F in accordance with the invention. The arrangement illustrated in FIG. 7 features an arrangement 110 of discharge openings 104 that are distributed over the surface segment 10K in a matrix-like fashion. The discharge openings 104 of the arrangement 110 of discharge openings are generally distributed over the respective surface segment in order to influence the flow on or above the entire region of the surface segment 10 or 10K. A pressure chamber and a valve 107 are preferably assigned to the openings 104 of a surface segment 10, 10K. Alternatively, a pressure chamber 101 may also be assigned to the openings 104 of several surface segments 10, 10K.

The discharge openings 104 have a shape that is optimal for influencing a flow around the respective surface segment 10, 10K. In this case, it would be possible to utilize different shapes of discharge openings 104 within a surface segment 10, 10K. The discharge openings 104 may also be realized, e.g., in a circular, ellipsoidal or lunulate fashion.

A plurality of flow condition sensor units 17 and 17K is also arranged within a surface segment, wherein said flow condition sensor units are schematically indicated in the form of symbolic circles in FIG. 8.

All flow condition sensor units 17 and 17K provided for the high-lift system are functionally coupled to the activating unit C (FIGS. 3 and 4) in order to transmit current flow conditions at the location of the respective flow conditions sensor units 17 and 17K or the respective segment in the form of sensor signals that are respectively generated by each of the flow condition sensor units 17 and 17K. Based on the measured flow conditions, the activating unit C determines for each individual segment through which discharge openings 104 air should be discharged and the amount of air to be discharged in order to adjust a flight status of the aircraft that corresponds to the nominal commands generated by the specification device 30 for adjusting flight statuses of the aircraft.

In this case, the activating unit C simultaneously determines nominal commands for the actuators of the regulating flaps K and optionally also the actuators of the control surfaces S.

Different surface segments may be arranged adjacent to one another or such that they overlap one another on the surface of the suction side and/or the pressure side of the aerodynamic body, e.g., of the main wing and/or the regulating flap K.

It would also be possible that the activating unit C utilizes flow conditions that are determined by means of flow condition sensor units 17, 17K arranged in other surface segments 10, 10K for determining control commands for flow control devices 16, 16K.

Due to the corresponding function of the activating unit C, it also adjusts, in particular, the degree, to which the laminar flow on the respective surface segments 10, 10K can be influenced, by controlling the flow control devices 16 and 16K of one or more surface segments 10, 10K. For this purpose, corresponding values of the current control signal vector CS are determined. In this case, the activating unit C activates an actuator and, e.g., the valves 107 of several surface segments 10, 10K. It would be possible, in particular, to realize a pulsed discharge in this case.

It would alternatively or additionally be possible that the activating unit C activates an opening device on the respective discharge openings 104 by means of current control signal vectors CS or control commands CS for controlling the flow control devices 16; 16K in order to adjust the discharge flow on the respective discharge opening 104 by opening and closing said device.

It would additionally or alternatively be possible that the activating unit C is functionally coupled to a (not-shown) pressure generating device or flow conveyor drive that, in turn, is coupled to the pressure chamber in order to adjust the pressure in the pressure chamber by activating the pressure generating device accordingly and to thusly adjust the discharge speed on the openings 104 of the surface segments 10, 10K. In this case, it would be possible, in particular, to adjust the pressure in the pressure chamber by means of a control signal vector CS or control commands CS based on the flight status and, in particular, based on the flying speed and the flying altitude or variables derived thereof. It would also be possible that the activating unit C deactivates the pressure generating device by means of a control signal vector CS or control commands CS in certain flight status modes such as, e.g., in the cruising mode. The pressure generating device also may generally operate with a fixed adjusted power or be realized in such a way that it varies or controls the suction pressure and/or the discharge pressure and/or the differential pressure based on a corresponding activation by an activating function.

The flow conveyor drive may be installed in or integrated into a channel connected to the opening.

The compressed air can be made available in different ways, e.g., by the engine, an auxiliary turbine (e.g., a so-called Auxiliary Power Unit or APU), via the intakes of the air conditioning system, via openings in a faring, e.g., of the regulating flap or via any other openings/suction points, e.g., in the leading edge region of the wing and/or in the lateral edge region of flaps. In this case, flow conveyor drives also may be integrated into the corresponding connecting channels leading to the air sources in order to make available the corresponding pressure and/or mass flow.

In these embodiments of the invention, the mass or volume flow in the flow control devices 16; 16K or a variable corresponding thereto may be used as control variable, i.e., as a variable or manipulated variable to be adjusted by means of the activating unit, wherein the aforementioned valve and/or pressure generating device or flow conveyor drive is activated by means of the control signal vector CS or control commands CS depending on the respective embodiment.

In an alternative embodiment of the flow control devices 16; 16K, these devices may respectively consist of a piezoelectric actuator such that the voltage applied to the piezoelectric actuators is controlled with the control signal vectors CS or the control commands CS. In the embodiment with flow control devices 16; 16K in the form of plasma actuators or nuclear-based actuators, the amperage for controlling said actuators and/or the voltage to be applied thereto is controlled with the control signal vectors CS or the control commands CS. The flow control devices 16; 16K may furthermore consist of actuators that operate on the basis of chemical processes, wherein the control signal vectors CS or the control commands CS define the concentration of a chemical substance such as a catalyst that triggers, e.g., chemical reactions such as small explosions.

According to the invention, it would be possible, in particular, that the flow control devices 16; 16K realize a pulsed discharge flow on the surface of the main wing and/or the regulating flap in the region of the flow control devices 16; 16K based on the control signal vectors CS or control commands CS. The flow condition sensor units 17, 17K may generally consists of a sensor for detecting the flow condition properties on the upper side of the main wing M and the flap K, wherein said sensor is realized in such a way that the activating unit C can positively determine the flow condition by means of the signal generated by the sensor, particularly in dependence on the flight status sensor signals 40a, and that it can be determined whether a laminar or separated flow is present and can be detected or measured by means of a comparison with corresponding limiting values, particularly in dependence on the flight status sensor signals 40a.

The lift state specification device 30 may feature a manual actuating device 31 that serves for manually adjusting the position of the regulating flap K and generates nominal commands 31a and/or an operating mode input device and/or an autopilot 34 that respectively generates nominal autopilot commands 34a. The flow control specification device or lift state specification device 30 is functionally connected to the activating unit C in order to transmit the respective nominal commands 31a and 34a to the activating unit.

The respective control flaps provided on the aircraft such as, e.g., the ailerons 5a, 5b or the spoilers 2a and 2b are assigned at least one actuator and/or drive unit that, according to the invention, respectively is optionally activated by a flight control unit by means of command signals in order to adjust the respectively assigned control flaps S and to thusly control the aircraft F. In this case, it would be possible that one of these control flaps is respectively assigned one actuator or a plurality of actuators in order to improve the failures safety of the aircraft system.

The activating unit C of the high-lift system HAS according to the invention may also be functionally integrated into the flight control unit. In this embodiment of the invention, nominal commands for controlling or moving the actuators of the control flaps S, 2a, 2b, 5a, 5b are generated in the flight control unit based on the nominal control commands 31a of the control input device 31 and/or the nominal autopilot commands 34a of the autopilot 34 and, in particular, nominal commands for controlling the actuator for adjusting the flow control devices 16, 16K and/or the actuator or flap drive of the regulating flap K to be activated are generated in the activating unit C of the flight control unit and these commands are transmitted to said actuators.

The actuator for adjusting the flow control devices 16, 16K may consist, in particular, of the assigned valve and/or the respectively assigned pressure generating device or the assigned flow conveyor drive. The flight control unit may be realized in the form of a flight status control unit in this case and have a control function that receives control commands from the control input device 30 and sensor values 40a from the sensor unit 40. The control function is realized in such a way that it generates control commands for the actuators of the control surfaces S and/or the regulating flaps K in dependence on the control commands 30a and the measured and received sensor values 40a and transmits these control commands to said actuators such that the aircraft F can be controlled in accordance with the control commands by controlling the actuators.

In order to actuate the high-lift system HAS in-flight, the pilot generates a nominal command 31a for adjusting the high-lift system HAS and the state of lift of the aircraft by means of an actuating device 31. The nominal command 31a for the high-lift system HAS may consist, e.g., of a three-dimensional flight status vector for adjusting or realizing a relative change of the state of lift of the aircraft. It would also be possible to generate nominal commands or nominal command vectors 34a by means of an autopilot 34. In this embodiment of the invention, the flow control specification device or lift state specification device 30 activates the activating unit C that, in turn, subsequently activates at least one actuating unit of the flow control devices 16; 16K arranged in a segment 10 or 10K on the surface of the airfoil and/or at least one regulating flap K, as well as an actuator 21 of the regulating flaps K. According to the embodiment illustrated in FIG. 3, the activating unit C generates flow condition control commands 316 and 316K for controlling or moving at least one actuator of the flow control device 16 or 16K of each concerned segment 10 or 10K in order to adjust the flow control devices, as well as control commands 350 for controlling or moving at least one actuating device 20 of the regulating flaps 20 to be activated, based on nominal commands 30a of the specification device 30 and transmits these control commands to said actuators.

It would also be possible that the activating unit C generates control commands 320 for adjusting the regulating flap K based on corresponding inputs on the specification device 31 and nominal commands 31a generated thereof and transmits these control commands to an actuator 20 in order to adjust this actuator. The activating unit C may also generate such control commands for adjusting the regulating flap K based on flight status data. In this case, it would furthermore be possible that the flow condition control commands 316 and 316K are determined in dependence on the control commands for adjusting the regulating flap K, as well as in dependence on the control commands 321 that are generated for the actuator 12 of the at least one control flap S and serve for adjusting the control flap S. It would alternatively be possible that the respective current control signal vector generated by the activating unit C contains the control commands for controlling the actuator 21 of the at least one control flap S and the flow control devices 16; 16K and optionally the regulating flaps, as well as information as to which flow control devices should be actuated at a time.

Due to the control or movement of the actuators of the flow control devices, the local coefficients of lift or the ratios between the coefficient of drag and the coefficient of lift are changed in a predetermined fashion in the wingspread region, in which the segment 10 or 10K with the respectively activated flow control device is situated. If several segments 10, 10K are arranged in the spanwise direction and/or in the chord direction of the main wing or the flap K, it would be possible that a segment activating function balances and consolidates the flow condition control commands 316 and 316K for the flow control devices of the respective segments or respectively determines a master control command.

The inventive control unit therefore generally features a specification device 30 with an activating function for generating nominal commands for drive units in order to adjust flow control devices 16 and 16K of at least one surface segment 10 or 10K and/or nominal commands for drive units in order to adjust at least one regulating flap per airfoil, wherein said specification device determines corresponding nominal commands for controlling adjusting devices on the wings based on the nominal commands for controlling the aircraft such that the state of lift of the aircraft is adjusted and/or the flight status of the aircraft is changed or influenced in accordance with the nominal commands due to the activation of said adjusting devices.

In the exemplary embodiment according to FIG. 3, in particular, the activating unit C may feature a control algorithm that corrects the aforementioned input values in accordance with the nominal commands 30a received thereby ("complete control").

The control algorithm of the activating unit C may on the one hand form a synthesis of a degree of lift, drag or lift/drag from sensor data (particularly of a sensor unit 17 in the form of pressure sensors on the airfoil or the flap K) and on the other hand be realized in the form of a robust control algorithm in order to attain a predetermined target value for the above-mentioned degree. The controller is supported by an Anti-Wind-Up-Reset-Structure. The degree is obtained from a combination of time integration and look-up table and can be bijectively linked with a flight-relevant variable such as, e.g., the lift. It is therefore possible to indirectly specify, e.g., a lift or coefficient of lift that is subsequently converted into a specified value for the degree by the algorithm. This specified value for the degree is referred to as nominal value below and used for determining the difference referred to the actual value of the degree.

The controller may be designed with a method for the synthesis of robust controllers based on a linear Multivariable-Black-Box-Model. During the identification of the linear Multivariable-Black-Box-Model, suitable interference signals in the form of abrupt changes of the actuation variable are generated and the reaction of the degree value to these interference signals is measured. A linear differential equation system that represents the basis for the controller synthesis is obtained from the dynamic behavior of the reaction with the aid of parameter identification methods. Many different identifications of this type result in a family of models, from which a representative or average model is selected for each synthesis. Certain methods (e.g., H8-synthesis, robustification, robust LoopShaping) can be utilized in the controller synthesis. The thusly created classic linear control loop can be supported by an Anti-Wind-Up-Reset-Structure that, if the requested manipulated variable lies above the realizable manipulated variable, corrects the internal status of the controller in such a way that an integration segment in the controller respectively prevents the controller from overshooting and stopping. Consequently, the ability of the controller to react is also preserved if unrealistic requests are received such that the operational reliability is improved. It is always adapted to the current situation and not delayed by previous manipulated variable limitations.

The controller may be realized, in particular, in the form of an optimal controller that receives all required input variables in the form of control variables and generates the different output signals for the flow control device 16 or 16K and/or the actuator 21 or flap drive of the at least one activated regulating flap K in accordance with a control algorithm in a matrix-like method—based on calibrations and parameters for the assignment of control variables and manipulated variables in dependence on flight status variables derived from said calibrations.

According to the invention, it is therefore proposed to determine a flight-relevant characteristic (lift, coefficient of lift, drag, lift/drag, etc.) from substitute control variables in a non-stationary fashion, to subsequently utilize this characteristic for a nominal value comparison and to ultimately make it possible to thusly adjust a basically arbitrary value for the respective characteristic—within the frameworks of physics—and to reach said value by means of linear, robust control algorithms designed for a linear model.

Due to the abandonment of heavy movable parts, the control system is significantly faster than conventional mechanical solutions such that local flow phenomena can be purposefully suppressed or utilized.

FIG. 4 shows another embodiment of the invention, in which the high-lift system features a flow control activating device C1 that forms part of the activating unit C and generates a flow condition control variable 416 or 416K (FIG. 4) for the actuator of the flow control device 16 or 16K of a wing and/or a regulating flap K from the nominal commands 30a for each respective segment 10 or 10K of the at least one segment 10 or 10K, wherein said flow condition control variable corresponds to a local coefficient of lift required for the region of the respective segment at a time. Since the actuator of each respective segment is activated and controlled by means of the flow condition control variable 416, 416K, the respectively activated actuator of the flow control devices 16; 16K is controlled such that the respectively assigned flow control devices 15 and 15K influence the flow condition on the airfoil in the local segment and thusly influence and vary, in particular, the status of the laminar flow on the respective segment 10 or 10K. In this case, the activating unit C generates nominal commands 416, 416K that are realized in the flow control activating device C1 in an inner control loop with the flow control devices 16; 16K. The flow control activating device C1 may also be integrated into the activating unit C, i.e., consist of a sub-function thereof.

The actual laminar flow condition on the respective segment 10 or 10K is detected by means of the flow condition sensor unit 16 or 16K and the measured actual flow condition value in the form of the sensor signal 62 or 62K is compared with the value of an input signal 416 or 416K in a comparator 65 or 65K. The value of the input signal may be the value of the nominal command 30a generated by the specification device 30 or be derived thereof. In this case, it would be possible, in particular, that the value of the input signal 416 or 416K is determined from a nominal command 30a in the activating unit C.

According to FIG. 4, the control of the aircraft or the adjustment of a state of lift of the aircraft by means of an activating unit C may be realized such that the activating unit generates control commands CS with a control signal 420 for actuating the regulating flap K, as well as input signals 416, 416K for at least one flow condition control unit 60 or 60K, for a flow control device 16 on the main wing and/or a flow control device 60K on the regulating flap K. The respective flow condition control unit 60 or 60K carries out a comparison between the input signal and the actual flow condition value 62 or 62K in the form of the sensor signal of the flow condition sensor unit 17 or 17K of each segment. A flow condition control command 61 or 61K, with which the flow condition to be adjusted is realized by actuating the flow control devices 16 and 16K accordingly, is determined for each segment 10 and 10K by means of a manipulated variable determining function 67 or 67K and the segment activating function 68 or 68K. In this embodiment, in particular, it is therefore proposed:

that a flow value for one respective segment is determined as actual value that corresponds to the current local coefficient of lift from the flow condition measured by the flow condition sensors of the segment, that a comparison value is determined from the nominal flow value and the actual flow value, and that a nominal command for the flow control devices is determined from the comparison value in order to actuate the flow control devices.

In the functionalities illustrated in FIGS. 3 and 4, the sensor signals 17a and 17Ka determined by the flow condition sensor unit 17; 17K can be fed back to the activating unit C. In addition, the adjusting position of the regulating flap S determined by means of a corresponding sensor unit is also fed back to the activating unit C in the form of the sensor signal 20a. Based on these feedbacks, the state of lift of the airfoil can be controlled in accordance with the nominal specifications 30a in the activating unit C.

In the realization of the high-lift system, it needs to be observed that this system, as well as the activating unit integrated therein, is realized in the form of a reliable real-time system that reacts to a newly measured flow condition, e.g., within t1=0.1 s, preferably within 0.05 s, and generates the current input signal vector CS or the nominal commands CS in accordance with the new flow condition. The system reaction time therefore refers to the period of time, in which the inventive high-lift system HAS with the flow control devices 16; 16K and the corresponding actuator systems can fail without reaching a catastrophic state of the aircraft, or to the period of time required by the high-lift system to react to aerodynamic events when a failure of flow control devices 16; 16K occurs, i.e., to act in a specific way. The response time t1 or the system reaction time depends on when this signal actually arrives at the respective flow control devices 16; 16K in the form of a control signal and said flow control devices respectively influence the flow. In rudimentary terms, this response time is composed of the length of a wing divided by the speed of sound plus the reaction time of any mechanical components that might be provided on the flow control devices 16; 16K such as, e.g., the mechanical valves or, if applicable, the starting time of the pumps. According to the invention, the concrete design of the flow control devices 16; 16K of the actuator type is chosen based on the applicable aerodynamic requirements and therefore also the time requirements of the high-lift system, for example the aforementioned system reaction time.

The control of the flow control devices 16; 16K and the regulating flaps by means of the activating unit C can be achieved with functions, by means of which measures are processed that realize, in particular, the following for the landing approach or the landing: a maximum permissible rate of vertical descent and/or a maximum permissible glide slope angle and/or a maximum permissible landing approach speed profile and/or a maximum permissible landing speed and/or a maximum permissible or desired and relatively low noise emission.

The activating unit may have a safety function that still allows a safe landing approach in case a brief failure of the flow control devices 16; 16K or their command or control path occurs. The safety function comprises a monitoring function that checks the operability and the aerodynamic effectiveness of the flow control devices 16; 16K and/or of the flow condition sensor units 17; 17K by comparing values of the sensor signals 17a and 17Ka with nominal values and detecting any deviation that exceeds a predetermined maximum deviation value. In order to carry out the aforementioned check of the operability and aerodynamic effectiveness, a comparison function may be integrated into the activating unit C and provide the following capabilities:

a nominal-actual comparison by means of a subtraction or the formation of a numerical ratio between nominal values and actual values and/or an estimating method for estimating the values, the generation of which is expected by the flow condition sensor unit 17; 17K at that time and can be treated as nominal values, based on the values of other aircraft sensors such as the flight status sensors and, in particular, based on the flight statuses determined by the flight status sensors.

The safety function furthermore has a reconfiguration function that, in case of such a deviation that exceeds the maximum permissible deviation value, switches the functions from the operating mode, in which a current control signal vector CS or control commands CS for controlling the actuators 21 of the regulating flaps K and the flow control devices 16; 16K are generated, to a second or safety mode, in which only the regulating flaps are actuated in accordance with the respective nominal commands 30a in order to adjust a predetermined state of lift of the aircraft and the flow control devices 16; 16K are no longer actuated such that the current control signal vector CS or the control commands CS in this operating mode contains/contain commands for controlling the actuators 21 of the regulating flaps K, but not the flow control devices 16; 16K.

This switch preferably takes place within the system reaction time. In this safety mode, the regulating flaps K or the high-lift flaps are displaced into a position, in which no control of the flow is required for the active flow control by means of the flow control devices 16; 16K, but the required aerodynamic performance of the aircraft is still ensured.

In order to switch to the safety mode, a switching function may be integrated into the flight control unit, wherein this switching function receives information as to the fact that a switch needs to be carried out from the activating unit C and subsequently activates the control flaps S in order to minimize the transient characteristics occurring due to the switch to the second operating mode, i.e., the changes in the flight status occurring during this process. This prevents the aircraft from reaching a catastrophic state during the landing approach due to the failure of a part of the flow condition sensor unit 17; 17K.

The high-lift system HAS according to the invention may also feature a pilot interface with a display device, on which the failure of a part of the flow condition sensor unit 17; 17K and/or a switch to the safety mode is displayed. In this way, the pilot can decide if he should manually adjust the flight status in the respective flight situation, e.g., by means of the specification device 30, such that the pilot maintains control over the flight status of the aircraft in each phase of flight, namely also in case of a failure in the flow control devices 16; 16K or in a flow condition sensor unit 17; 17K.

The invention claimed is:

1. An aircraft with airfoils that respectively comprises a main wing and at least one control flap that is adjustable relative to the main wing, as well as a high-lift system with at least one regulating flap that is arranged on the main wing and adjustable relative thereto by an actuating unit, wherein a lift of the airfoils and a state of lift of the aircraft are adjustable by adjusting the regulating flap by the actuating unit, featuring:

at least one arrangement of flow control devices that is situated in a surface segment of the main wing or the at least one regulating flap of each airfoil, wherein the surface segment extends in the spanwise direction, and is configured to influence the fluid flow flowing over the surface segment, the actuating unit configured to actuate the at least one regulating flap, an activating unit that is functionally connected to and configured to control the actuating unit and the flow control devices in order to adjust the regulating flap and the degree, to which the flow is influenced by the flow control devices, a specification device that is connected to the activating unit and configured to generate nominal commands for adjusting the state of lift of the aircraft, wherein the activating unit is configured to generate commands for the actuating unit and the flow control devices based on nominal commands of the specification device, wherein the generated commands are configured to adjust the regulating flap and the degree, to which the flow is influenced by the flow control devices, and thusly adjust the state of lift of the aircraft, wherein the at least one arrangement of flow control devices situated in a surface segment of the main wing that extends in the spanwise direction and at least one regulating flap of each airfoil additionally features flow condition sensor units for measuring the flow condition on the respective segment, wherein the activating unit has a control function, which generates commands for the actuating unit and the flow control devices based on nominal commands of the specification device and the flow conditions measured by the flow condition sensor units in order to adjust the degree, to which the flow is influenced by the flow control devices, wherein the activating unit has a safety function with a monitoring function that compares the values of the sensor signals with nominal values and detects any deviation that exceeds a specified maximum deviation value, and a reconfiguration function that, in case of the detection of such a deviation that exceeds the maximum deviation value, switches over from the operating mode, in which current control signal vectors or control commands for controlling the actuators of the regulating flaps and the flow control devices are generated, to a safety mode, in which only the regulating flaps are actuated in accordance with the respective nominal command in order to adjust a predetermined state of lift of the aircraft.

2. The aircraft according to claim 1, wherein the activating unit is configured to prioritize and generate amplifying factors for the commands for the actuating unit and for the flow control devices in order to adjust the magnitude of the commands for the actuating unit and the magnitude of the commands for the flow control devices in relation to each other.

3. The aircraft according to claim 2, wherein the activating unit is designed such that it generates the amplifying factors for the commands for the actuating unit and for the flow control devices in functional dependency of the nominal commands of at least one of the specification device, the sensor signals of the flight status sensor unit and the sensor signals of the flow condition sensor unit.

4. The aircraft according to claim 1, wherein the specification device is configured as specification device which is functional part of a pilot interface which has an input device and which is configured such that a pilot can manually select input commands with the input device.

5. The aircraft according to claim 4, wherein the specification device is configured as a lift state specification device which comprises the input device for selecting a value for the lift of the aircraft.

6. The aircraft according to claim 4, wherein the specification device is configured as a flow state specification device which comprises the input device for selecting a value for the fluid flow flowing over the surface segment, whereby the pilot can specifically select the magnitude of the influence of the fluid flow flowing over the surface segment and in particular the magnitude of values of the current control signal vector for at least one of speed and throughput of fluid being blown out of outlet openings of the flow control devices.

7. The aircraft according to claim 1, wherein the degree to which the flow is influenced by the flow control devices, is predetermined and the activating unit generates commands for the actuating unit based on this degree and transmits these commands to the actuating unit in order to control said actuating unit and adjust the regulating flap.

8. The aircraft according to claim 1, wherein the activating unit is configured such that the activating unit generates a current control signal vector comprising commands for controlling the actuating unit of the at least one regulating flap and the flow control devices by a controller model for the aircraft and transmits this control signal vector to the actuating unit and the flow control devices, wherein the activating unit determines the current input signal vector based on the nominal commands of the specification device, the sensor signals of a flight status sensor unit and sensor signals of a flow condition sensor unit.

9. The aircraft according to claim 8, wherein the function of the activating unit which generates a current control signal vector for controlling the actuating unit of the at least one regulating flap and the flow control devices comprises a matrix operation with a current input signal vector, a factorization matrix comprising factors, wherein the current control signal vector is generated based on the multiplication of the current input signal vector with the factorization matrix, wherein the current input signal vector comprises the nominal commands of at least one of the specification device, the sensor signals of the flight status sensor unit and the sensor signals of the flow condition sensor unit.

10. The aircraft according to claim 1, wherein the activating unit is configured such that the nominal commands for the actuators and the flow control devices are determined based on a characteristic for the lift or for the ratio between the coefficient of drag and the coefficient of lift and generated based on at least one of nominal commands of the specification device and flow conditions measured by flow condition sensor units in order to adjust at least one of the regulating flap and the degree, to which the flow is influenced by the flow control devices.

11. The aircraft according to claim 10, wherein the specification device features a device for selecting an automatic operating mode, which generates a characteristic for the lift or for the ratio between the coefficient of drag and the coefficient of lift in order to adjust the state of lift of the aircraft.

12. The aircraft according to claim 1, wherein the specification device features a device for the manual actuation thereof, which generates a value for the lift or for the ratio between the coefficient of drag and the coefficient of lift or an adjustment that corresponds to such a characteristic for adjusting the state of lift of the aircraft in order to adjust an aerodynamic lift behavior of the airfoils, wherein nominal commands for activating the actuators for adjusting the regulating flaps and nominal commands for adjusting the degree, to which the flow is influenced by the flow control devices, are generated from said characteristic.

13. The aircraft according to claim 1, wherein the aircraft features:
a state of adjustment sensor unit that serves for detecting an adjusting position of the regulating flap and an input side of which is functionally connected to the activating unit,
a flight status sensor unit that serves for detecting flight statuses of the aircraft and is functionally connected to the activating unit,
wherein the activating unit is configured to carry out a selection of the flow control devices to be actuated in dependence on the flight status in order to optimize local coefficients of lift on the airfoil and generates commands for the actuators and the flow control devices based on nominal commands of the specification device in order to adjust the state of lift of the aircraft.

14. The aircraft according to claim 1, wherein the regulating flap consists of a high-lift flap that is arranged on the airfoil of the aircraft, wherein the arrangement of flow control devices and of flow condition sensor units is arranged on at least one of the high-lift flap and on the main wing.

15. The aircraft according to claim 1, wherein the flow control device of a main wing or the regulating flap comprises a pressure chamber that is arranged in at least one of the main wing and the regulating flap and serves for accommodating pressurized air, an outlet chamber with outlet openings, one or more connecting lines for connecting the pressure chamber to the outlet chamber and at least one valve that is integrated into the connecting line and functionally connected to the flight control unit, wherein the activating unit activates the valve by the current control signal vector in order to block the air under pressure situated in the pressure chamber from flowing through the outlet openings or to allow this air to flow through the outlet openings with at least one of a corresponding speed and throughput in accordance with the control values of the current control signal vector and to thusly influence the flow around the surface of the main wing or the regulating flap.

16. The aircraft according to claim 1, wherein the activating unit has a segment activating function that is configured such that it generates at least one of control commands for the flow control device of each segment and control commands for the actuator based on the control signals of the activating unit, namely by an optimization with consideration of at least one of the currently available power, dynamics of the flow control device and of the actuator of the regulating flap.

17. The aircraft according to claim 1, wherein the segment comprises several segments that are arranged in succession referred to the spanwise direction.

18. The aircraft according to claim 1, wherein the arrangement of flow control devices comprises discharge openings that are arranged in one segment or several segments and a flow generating device that is arranged in the wing and discharges the fluid from the discharge openings in order to influence the coefficient of lift that locally occurs on the segment.

19. The aircraft according to claim 18, wherein the arrangement of flow control devices additionally features intake openings that are arranged in one segment or several segments and a suction device that is arranged in the wing and fluidically connected to the intake openings, wherein said suction device takes in fluid from the intake openings in order to influence the coefficient of lift that locally occurs on the segment.

20. The aircraft according to claim 1, wherein the arrangement of flow control devices comprises loudspeakers that are arranged in one segment or several segments and the activation of which makes it possible to influence the coefficient of lift that locally occurs on the segment by generating air oscillations or wherein the arrangement of flow control devices is composed of piezoelectric actuators that are arranged in one segment or several segments on the surface of the wing and the activation of which makes it possible to influence the coefficient of lift that locally occurs on the segment by generating air oscillations.

21. The aircraft according to claim 1, wherein a comparison function is integrated into the activating unit in order to form the deviation for checking the functionality, wherein said comparison function provides the options of carrying out a nominal-actual comparison by a subtraction or of forming a ratio between nominal values and actual values.

22. The aircraft according to claim 21, wherein a comparison function is integrated into the activating unit in order to form the deviation for checking the functionality, wherein said comparison function provides the option of carrying out an estimating method for estimating the values, the generation of which is expected by the flow condition sensor unit at that time and can be treated as nominal values, based on the values of other aircraft sensors.

23. The aircraft according to claim 1, wherein the high-lift system features a pilot interface with a display device, on which at least one of the failure of a part of the flow condition sensor unit and a switch to the safety mode is displayed.

* * * * *